United States Patent [19]

O'Connell et al.

[11] Patent Number: 5,241,632
[45] Date of Patent: Aug. 31, 1993

[54] PROGRAMMABLE PRIORITY ARBITER

[75] Inventors: Anne O'Connell; Tadhg Creedon, both of Galway; Deidre A. Smith, Kildare, all of Ireland

[73] Assignee: Digital Equipment Corporation, Maynard, Mass.

[21] Appl. No.: 828,026

[22] Filed: Jan. 30, 1992

[51] Int. Cl.⁵ .......................................... G06F 13/14
[52] U.S. Cl. .................................. 395/325; 395/275; 395/425; 395/725; 364/DIG. 1; 364/228.3; 364/228.5; 364/229; 364/229.2; 364/230; 364/230.1; 364/231.4; 364/232.8; 364/240; 364/240.1; 364/240.4; 364/240.8; 364/241.2; 364/241.3; 364/242.6
[58] Field of Search ............... 395/325, 725, 425, 275; 364/DIG. 1, 200

[56] References Cited

U.S. PATENT DOCUMENTS

| | | | |
|---|---|---|---|
| 4,719,569 | 1/1988 | Ludemann | 364/200 |
| 4,814,974 | 3/1989 | Narayanan et al. | 395/325 |
| 4,841,178 | 6/1989 | Bisson | 395/725 |
| 4,894,565 | 1/1992 | Marquardt | 395/725 |
| 4,897,786 | 1/1990 | Pimm et al. | 395/425 |
| 4,953,081 | 8/1990 | Feal et al. | 395/325 |
| 5,014,190 | 5/1991 | Johnson | 364/200 |
| 5,072,363 | 12/1991 | Gallagher | 395/725 |
| 5,081,297 | 1/1992 | Lebel et al. | 395/325 |
| 5,111,424 | 5/1992 | Donaldson et al. | 395/725 |
| 5,129,092 | 7/1992 | Bland et al. | 395/725 |

Primary Examiner—Allen R. MacDonald
Assistant Examiner—Tariq R. Hafiz
Attorney, Agent, or Firm—Kenyon & Kenyon

[57] ABSTRACT

The present invention is directed to a programmable logic circuit used as an arbiter to control access to a shared resource, e.g. a system bus, by N devices in a computer system. The programmable arbiter according to the present invention, implements a logic design with sufficient flexibility to accommodate and selectively incorporate features of several different arbitration schemes including a straight priority scheme, a programmable arbitration, and a rotating priority arbitration scheme. In addition to these arbitration schemes, the arbiter of the present invention supports an extended programmable arbitration scheme whereby a device which is requesting access to the shared resource may be granted access to the resource even if it has used up its allocated share of bandwidth if there are no other devices requesting access to the shared resource. Furthermore, bus bandwidth may be allocated to particular device or to a group of devices at a particular priority level. In addition to providing for programmable allocation of bus bandwidth, the arbiter of the present invention permits the number of clock cycles allocated per bus window for one requesting device to be different from the number of clock cycles allocated per bus window for another device. In this manner, the size of the bus window can be designed to accommodate the individual requirements of each device permitting maximization of both the device's and the system's overall efficiency.

24 Claims, 4 Drawing Sheets

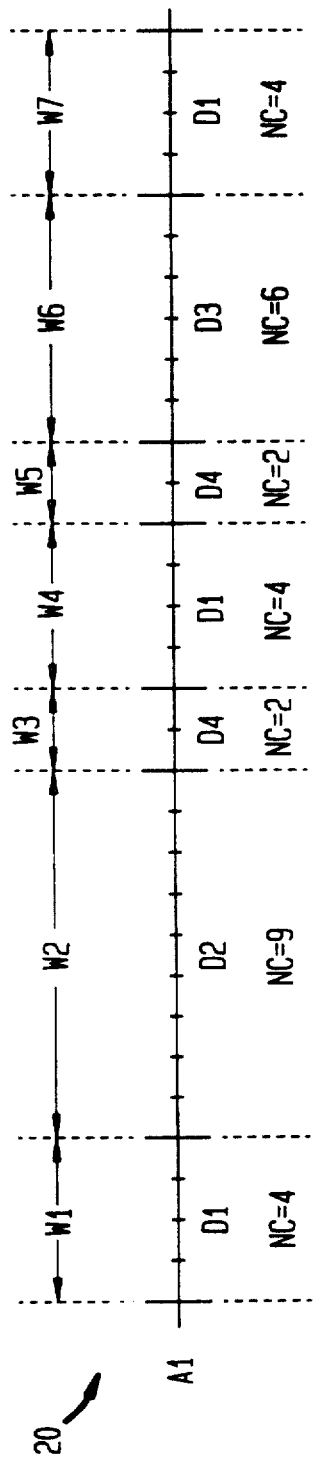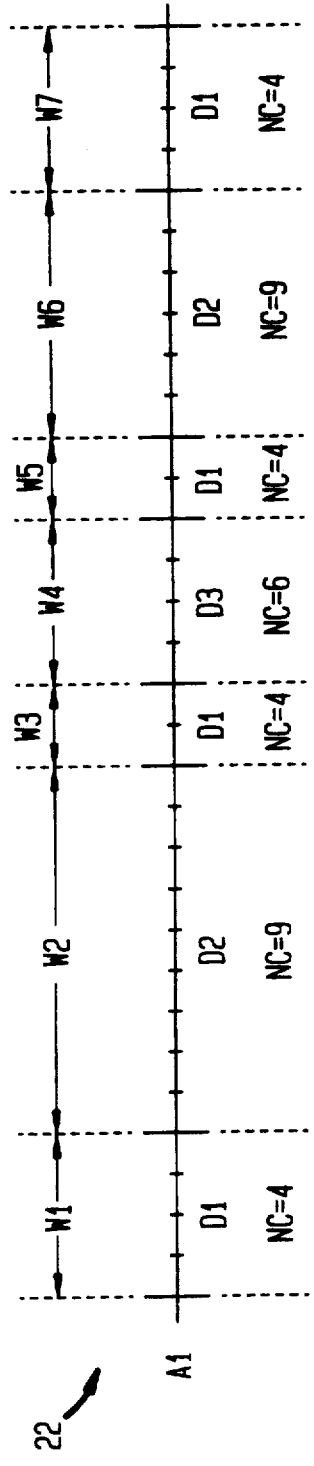

PROGRAMMABLE PRIORITY ARBITER

FIELD OF THE INVENTION

The present invention is directed to resource allocation and arbitration in a computer system and, more particularly, to a programmable logic circuit used as an arbiter to control access to a shared resource by N devices.

BACKGROUND OF THE INVENTION

In modern computer design resources provided in a computer system are often shared among a plurality of operating devices for efficient performance. A shared resource can comprise, e.g., a system bus which is used for transferring data between the plurality of operating devices, such as processors and I/O controllers, which comprise part of the computer system.

Whenever a common resource is provided in a computer system, fairness becomes a design issue. Fairness concerns the fair allocation of the services provided by the resource among the several devices requesting access to the resource. It is typically a design criteria in the implementation of a resource that no one processing device so dominate the use of the resource that other processing devices of the computer system are unable to receive adequate service from the resource.

In modern computer systems, arbiters are frequently used to ensure the fair allocation of access by requesting devices, e.g. the processors, to a shared resource such as the system bus. Two types of known arbiters are priority based and round robin arbiters.

In a known straight priority scheme, the requester with the highest priority gets access to the shared device. In such systems, devices with lower priority than the requesting device are denied access to the resource until there are no higher priority requests pending. While such a system permits the highest priority devices to have their requests serviced, it presents the possibility that the lower priority devices will be locked out of access to the shared resource completely for significant periods of time.

In the known round robin arbitration scheme, all the requestors are typically at the same priority level with the shared resource being accessed in a round robin manner. In such a system, all requestors are given access to the shared resource in sequence. While this approach insures that no particular device will be unfairly denied access to the shared resource, it fails to provide for greater amounts of access to the shared resource by devices that should be assigned a higher priority than other requesting devices, for improved overall operating efficiency of the computer system.

In addition to the known fixed straight priority scheme and the fixed round robin arbitration scheme, some known arbitrators provide for a limited amount of programmability with regard to the amount of access that any one requestor may have to the shared resource in a given time period. However, in such known systems, once a device has used up its allocated share of access to the shared resource, it must wait for a new time period for resource allocation to begin before it can re-access the shared resource.

Furthermore, in the above systems, the allocation time periods are fixed in terms of a preselected number of clock cycles rather than in terms of a number of bus windows. With the allocation period being fixed in terms of clock cycles instead of bus windows, the ability to programmably allocate access to the system bus is somewhat limited since the total number of clock cycles per window always remains fixed.

Such a system, which limits total access by a requestor to a resource, becomes wasteful when there are no other devices requesting access to the resource, and a particular requestor which could take advantage of the resource's potential is denied access because it has already used up its permitted share of access for the particular allocation time period. In such systems, as noted above, the requestor which has used up its share of allocated access must wait until a new time period begins before being permitted access to the shared resource again.

Thus, presently known arbitration schemes are limited in their ability to arbitrate access to a common shared resource in an efficient and flexible manner.

SUMMARY OF THE INVENTION

The present invention provides a logic circuit that functions as a programmable arbiter to arbitrate between N devices of a computer system for access to a shared resource. The programmable arbiter according to the present invention implements a logic design with sufficient flexibility to accommodate and selectively incorporate features of several different arbitration schemes. These arbitration schemes include a straight priority scheme, a programmable arbitration scheme, and a rotating priority arbitration scheme. Moreover, the present invention provides an extended programmable arbitration scheme which makes it possible for a device that is requesting access to the shared resource to be allocated a shared resource access window even if the device has already used up all its allocated shared resource access windows, when there are no other requests being asserted during a particular window. In the present invention, allocations of access to the shared resource are granted in terms of shared resource access windows. Each window comprises a fixed number of clock cycles which a particular device is allocated when it is assigned access to the shared resource. The number of clock cycles allocated per window for one requesting device may be different from the number of clock cycles allocated per window for another device. In this manner, while each device is allocated access to the shared resource in terms of windows, the actual total amount of time a device is allocated access to the shared resource is the number of windows it is allocated, times the number of clock cycles per window for the given device. The shared resource may comprise, e.g. a bus.

The ability to vary the number of clock cycles, allocated to each of the N devices in the system per window, gives the arbitration scheme of the present invention greater flexibility than systems which require all bus windows to have the same number of clock cycles. In this manner, the size of each bus window can be designed to accommodate the individual requirements of each particular device. This permits maximization of both the device's and the system's overall efficiency. For maximum efficiency, the number of clock cycles allocated to a particular device per bus window, is determined as a function of the time the particular device requires on the bus to complete a meaningful bus transaction.

While the number of clock cycles allocated to each of the N devices per bus window may be varied, the total allocation period is defined in terms of a selected number of bus windows. Thus, each allocation period may vary in terms of the total number of clock cycles per allocation period depending on which devices are allocated access to the bus.

The term overall bus bandwidth is used to refer to the total number of bus windows which are available in a particular allocation period. In the apparatus of the present invention, the overall bus bandwidth is a fixed number of bus windows in which devices may access the shared resource. A particular device's share of access to the shared resource in any one allocation period is referred to as the device's percentage of the overall bus bandwidth. For example, in a system where the allocation period for access to the bus consists of ten bus windows, a device which is allocated one bus window per allocation period would have a 10% allocation of the available overall bus bandwidth.

The programmability feature of the present invention permits for the adjustable allocation of bandwidth to each of the N devices within the system, without losing the benefits of a priority based arbitration scheme, as will appear.

The present invention provides for two different ways of varying a particular devices time priority allocation. First, the number of clock cycles per window may be varied depending on the needs of each particular device utilizing the shared resource. Second, the number of windows per allocation period allocated to each device may be varied depending on the amount of overall bus bandwidth that should be allocated to each particular device, for maximum operating efficiency.

Another feature of the present invention permits a device which has used up its share of allocated bus bandwidth to access the shared resource when no other devices are requesting access to the shared resource. This feature gives the apparatus of the present invention a significant advantage in terms of allocation efficiency over the known systems, which deny a device access to the resource once it had used up its allocated share of access to the resource for the given allocation period.

An additional feature of the arbitration scheme according to the present invention is the ability to permit multiple devices to exist at the same priority level relative to the other devices in the system. In such cases where there are multiple devices at the same priority level, the arbitration scheme provides the capability of using a straight or rotating priority arbitration scheme to allocate access to the shared resource between those devices which are at the same priority level.

Thus, an arbiter implementing the features of the present invention provides significant advantages in terms of both the variety of arbitration schemes which may be implemented in any desired combination, and the overall efficiency of the bus bandwidth allocation as compared to the known arbiters.

BRIEF DESCRIPTION OF THE DRAWINGS

FIG. 2 is a timing diagram illustrating the allocation of access to a shared bus, by an arbiter implementing the present invention, during a first allocation period.

FIG. 2A is a timing diagram illustrating the allocation of access to a shared bus by an arbiter implementing the present invention, during a second allocation period.

DETAILED DESCRIPTION

Figure 1:
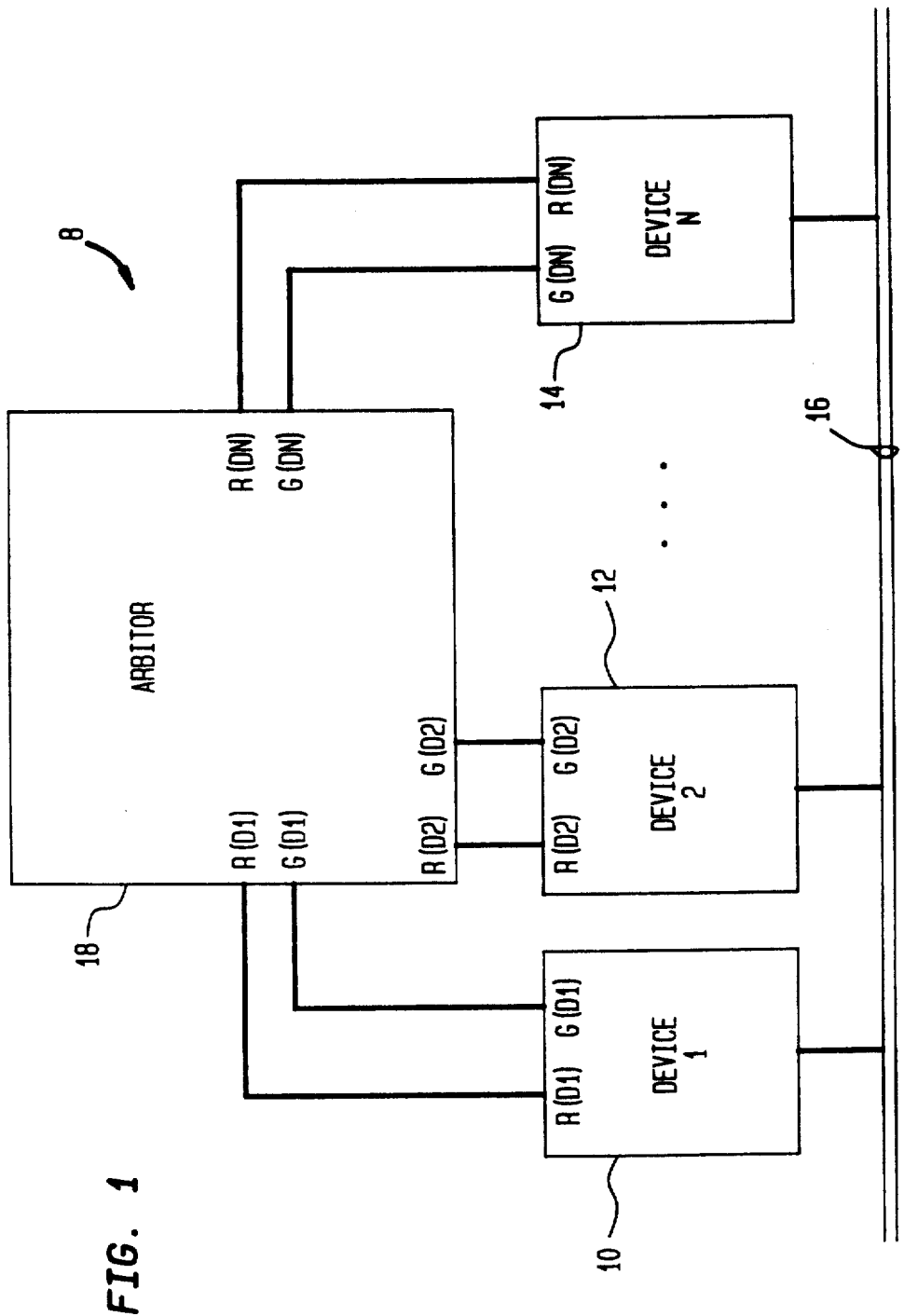
FIG. 1 shows a computer system wherein several devices are coupled to a common resource and a common arbiter in accordance with an exemplary embodiment of the present invention.

Referring now to the drawings and initially to FIG. 1, there is illustrated a computer system generally indicated by the reference numeral 8. The computer system comprises a number N of devices 10, 12, 14, each comprising, for example, a central processing unit (CPU). The devices 10, 12, 14 are each coupled to a common shared resource 16, such as a system bus, and a common state machine 18 used to arbitrate access to the system bus 16 among the N devices 10, 12, 14.

The devices 10, 12, 14, assert requests for access to the system bus 16 by outputting a corresponding access request signal, R(D1) thru R(DN), respectively. The request signals R(D1) thru R(DN), are each coupled to the state machine 18, as illustrated in FIG. 1.

The state machine 18 outputs grant signals, G(D1) thru G(DN), each corresponding to a respective one of the request signals R(D1) thru R(DN), with a single grant signal being asserted at any given time. The single grant signal which is asserted indicates which one of the devices 10, 12, 14, has been assigned access to the system bus 16. Each of the devices 10, 12, 14 has an input for receiving a corresponding one of the grant signals output by the state machine 18.

The state machine 18 combines preselected features of each of a straight priority arbitration scheme, a programmable arbitration scheme and a rotating priority arbitration scheme with the extended programmable arbitration scheme of the present invention, in a manner which is designed to provide an efficient allocation of access to the system bus 16 among the devices 10, 12, 14.

The following is a list of terms and definitions that will be used throughout the description of the present invention.

Dn = Device number n which can acquire access to the bus

L = the priority level for assignment of access to the bus; 1 is the highest possible priority L(Dn) = the level of priority assigned to device Dn with regard bus access R(Dn) = request by device Dn for access to the common bus PBW(Dn) = percentage of overall bandwidth allocated to a device Dn NWA(Dn) = number of windows allocated to device Dn in a particular allocation period NWU(Dn) = total number of arbitration windows already used by the device Dn in a particular allocation period NWU(Ln) = total number of arbitration windows used by devices at priority level Ln TNWA = total number of windows available per allocation period TNWU = total number of windows used in a particular allocation period NC(Dn) = number of clock cycles per window allocated to the device Dn As noted previously, the present invention incorporates features of several arbitration schemes. As will be described below, each scheme can be illustrated by pseudo code. The arbitration scheme, implemented in an arbiter according to the present invention, may include any desired combination of the various arbitration schemes described below. The various possible arbitration schemes capable of being combined in accordance with the present invention include the straight priority scheme, the programmable arbitration scheme, the extended programmable scheme, and the rotating priority arbitration scheme.

In the straight priority scheme, a device Dn at a priority level L is given access to the share resource if there are no other devices requesting access to the shared resource at a higher priority level.

A straight priority scheme may be represented by the following pseudo code:

```
IF R(D1) THEN
        arb_winner = D1
ELSE
        IF R(D2) THEN
                arb_winner = D2
        ELSE
                . . .
                        IF R(Dn) THEN
                                arb winner = Dn
                        ENDIF
                . . .
        ENDIF
ENDIF
``` where device D1 has been assigned priority level L=1, D2 priority level L=2, etc.

While the straight priority scheme is relatively simple to implement, it does not provide for the programmable allocation of bus bandwidth. In a straight priority scheme the devices are, in effect, allocated 100% of the bandwidth. In such a straight priority scheme, any one of the devices is free to use up all of the available bandwidth, denying devices at lower priority levels access to the shared bus 16.

In the programmable arbitration scheme, also referred to as a straight arbitration scheme with limited programmability, any number of M devices, D1 thru DM, are assigned priority levels L(D1) thru L(DM)=1 thru M, respectively. Furthermore, each one of the M devices is allocated a programmable amount of bandwidth which is the maximum amount of bandwidth the device can utilize. The amount of bandwidth allocated to each device is represented by the number of windows each device Dn is allocated in any given allocation period.

In such a system, the arbitration for the next available bus window in any particular arbitration period can be described by the following expression:

```
IF R(D1) AND ( NWU(D1) < NWA(D1) ) THEN
        arb_winner = D1
        NWU(D1) = NWU(D1) + 1
ELSE
        IF R(D2) AND ( NWU(D2) < NWA(D2) ) THEN
                arb_winner = D2
                NWU(D2) = NWU(D2) + 1
        ELSE
                . . .
                        IF R(Dn) AND ( NWU(Dn) <
                        NWA(Dn) ) THEN
                                arb winner = Dn
                                NWU(Dn) < NWA(Dn) + 1
                        ENDIF
                . . .
        ENDIF
ENDIF
```

-continued
```
ENDIF
```

In the above example of a programmable arbitration scheme which may be incorporated into an arbiter according to the present invention, if a request is asserted by the device D1, at the highest priority level, L=1, then the requesting device D1 will be assigned access to the next bus window. However, this is true only if the requesting device D1 has not already used up its allocated number of bus windows, NWA(D1).

If a request is asserted by device Dn at priority level, L(Dn), then the device Dn will only get the next bus window if it has not previously exceeded its allocated number of windows, NWA(Dn), and if no higher priority requests are asserted, R(D1) thru R(Dn−1), or if all the requesting devices at the higher levels have exceeded their allocated number of bus windows for the particular allocation period.

In such a programmable allocation scheme, the device at the top of the priority chain, D1, can use up to 100% of the bus bandwidth, if NWA(D1)=TNWA. Similarly, a device with the lowest priority, in this case DM, can use 100% of the bus bandwidth if NWA(DM)=TNWA, and if there are no higher priority devices requesting the bus.

Note that the programmable allocation scheme described above can act as a straight priority allocation scheme to the extent that particular devices are allocated 100% of the total available bandwidth. Where a device is allocated 100% of the bandwidth, it can never exceed its allocated number of windows, NWA(Dn), since NWA(Dn) is set equal to the total number of windows available in an allocation period, TNWA. This fact means that it is unnecessary to determine the number of windows used for a device which is allocated 100% of the bandwidth. Thus, a significant reduction in the complexity of the logic circuit required to implement the state machine 18 is possible whenever devices are allocated 100% of the bandwidth.

When it is known that certain devices will use a very small percentage of the overall bus bandwidth during normal operation, it is frequently most efficient in terms of implementation complexity and thus implementation costs to assign such devices 100% of the bandwidth represented by the devices having a NWA(Dn) equal to the total number of windows available in the allocation period, TWNA.

A further extension of the programmable scheme is to permit a device which has used up its share of allocated bandwidth to still get the next bus window if no other devices are requesting access to the bus 16. As noted above, such an arbitration scheme is referred to as an extended programmable scheme.

An extended programmable arbitration scheme may be implemented by the state machine 18, according to the present invention, for any number of M devices. The following pseudo code illustrates this possibility.

```
IF R(D1) AND
        ( (NWU(D1) < NWA(D1)) OR
        (/R(D2) AND /R(D3) AND . . . /R(DM) ) THEN
                arb_winner = D1
                NWU(D1) = NWU(D1) + 1
ELSE
        IF R(D2) AND
                ( (NWU(D2) < NWA(D1)) OR
```

```
        (/R(D1) AND /R(D3) AND ... /R(DM) ) THEN
                   arb_winner = D2
                   NWU(D2) = NWU(D2) + 1
ELSE
     ...
     IF R(Dn) AND
           ( (NWU(DM) < NWA(DM)) OR
             (/R(D1) AND /R(D2) ...
             AND /R(M-1)) ) THEN
                   arb_winner = DM
                   NWU(DM) = NWU(DM) + 1
     ENDIF
  ENDIF
ENDIF
``` where:

/R(D1) means that the device D1 is not requesting access to the bus

/R(D2) means that the device D2 is not requesting access to the bus

/R(DM) means that the device DM is not requesting access to the bus

The apparatus of the present invention includes additional features beyond the ability to implement a variety of arbitration schemes. The arbiter of the present invention provides for the ability to adjust the amount of bandwidth that any one particular device or priority level is assigned. Thus, the available bandwidth at any given priority level which corresponds to the number of windows available for use by devices at that level, may be programmably varied depending on the needs of devices on the particular priority level.

According to a feature of the present invention, two or more devices may be assigned the same priority level with the available bandwidth at that level capable of being allocated to the devices on that level, based on any of the above priority schemes or on the basis of a rotating priority scheme.

The ability to allocate a share of the available bandwidth to a particular level as opposed to individual devices offers the opportunity to decrease the number of counters required to implement the overall arbitration scheme, when implemented in accordance with the present invention. Depending on the arbitration scheme implemented, it may be possible to use a single counter to keep track of the number of windows used by all the devices at a particular priority level. This avoids the requirement that each individual device be provided with a counter to keep track of the number of windows used during an allocated period.

All of the devices on the particular level are assigned the same number of clock cycles per bus window and the arbitration scheme implemented to allocate access at that level does not require additional information on the number of windows used per device.

The straight priority scheme is one scheme which may be used to implement allocation of windows at a single level while requiring only a single counter to keep track of the number of windows used by all the devices on that level.

As noted above, rotating priority schemes may also be implemented to allocate the available bus bandwidth to devices on a particular level. In one particular rotating priority scheme that incorporates features of the programmable bandwidth allocation scheme, when two or more devices are both assigned the same priority level L, the devices present on that level are allocated to sublevels. Priority sublevels are indicated by the use of small letters, such as a, b, c, which are added to the number representing the priority level. The priority sublevels determine the order in which the requesting devices on a particular level are to be initially granted access to the bus 16. Thus, M devices, all on the same priority level, e.g. L=2, would be designated as having respective priority levels 2a thru 2m.

In the case of the rotating arbitration scheme described above, all M devices at a particular level are assigned a programmable amount of bandwidth. The arbiter 18 assigns the devices 1 thru M access to the bus 16 based on which device Dn, on the same particular priority level, has used up the least number of arbitration windows and still has some allocated number of windows remaining.

An example of such a rotating arbitration scheme for two devices D1 and D2, both on the same priority level, is illustrated by the following pseudo code:

```
IF R(D1) AND
    (( NWU(D1) < NWA(D1) ) AND
           ( (NWU(D1) <= NWU(D2)) OR /R(D2))
       THEN
           arb_winner = D1
           NWU(D1) = NWU(D1) + 1
ELSE
     IF R(D2) AND ( NWU(D2) < NWA(D2) ) THEN
           arb_winner = D2
           NWU(D2) = NWU(D2) + 1
     ENDIF
ENDIF
```

Note that in the above example, device D1 and D2 are both at the same priority level. However, D1 is at priority sublevel a and device D2 is at priority sublevel b. At the start of an allocation period, both devices D1 and D2 have used none of their allocated windows. Therefore, if D1 asserts an access request, R(D1), it will be granted access to the bus whether or not D2, which is located at the next priority sublevel b, is also asserting an access request R(D2). When D1 is granted access to the bus 16, the signal NWU(D1) will be incremented by 1 indicating that D1 has used one window.

If D1 and D2 both continue to assert access requests, D2 will be given access since the number of windows used by D1 will exceed the number of windows used by D2 at this time. In this manner, D1 and D2 will continue to be granted access to the bus on a rotational bases until they reach their number of allocated windows or the other device at the same priority level ceases to assert access requests.

The above example of a rotating priority scheme illustrates only one of many various rotating priority schemes which may be implemented as a feature of the present invention.

In addition to the above capabilities, the arbitration scheme of the present invention permits the arbitration windows to comprise different numbers of clock cycles. Thus, the arbitration window allocated to each particular device Dn may be set to contain a preselected number of clock cycles depending on the individual needs of any particular device for access to the common bus 16.

The ability to assign each of the N devices a bus window containing a different number of clock cycles, permits the allocation of windows which are adequately suited to each particular device's needs furthering overall system efficiency, in terms of efficient allocation of access to the shared bus 16. For maximum efficiency, the number of clock cycles allocated to a particular device per bus window, is determined as a function of how long the particular device requires to complete a meaningful bus transaction.

In this manner, while the number of bus windows per allocation period is fixed, the number of clock cycles per allocation period may vary depending on the particular devices which are allocated access to the bus 16 during any particular allocation period.

FIG. 2 and FIG. 2A are timing diagram which illustrate an example of how the total number of clock cycles may vary per allocation period. The allocation of bus windows for two full allocation periods, A1 (as shown in FIG. 2) and A2 (as shown in FIG. 2A), is illustrated. In the example, the full allocation period includes a total of 7 available bus windows W1 thru W7, with dotted lines being used in FIGS. 2 and 2A to separate the allocated bus windows.

In the illustrated example of FIGS. 2 and 2A, there are four devices, D1, D2, D3, D4 (not illustrated), each of which has been allocated a number of clock cycles per bus window. The allocation of the number of clock cycles per window, NC(Dn), is as follows:

| D1 | NC(D1) = 4 | D2 | NC(D2) = 9 |
| D3 | NC(D3) = 6 | D4 | NC(D4) = 2 |

During allocation period A1 20, the devices are allocated access to the seven available bus windows W1 thru W7 in the following order: D1, D2, D4, D1, D4, D3, D1. Thus, allocation period A1 20 consists of 7 bus windows occupying a total period of 31 clock cycles.

During allocation period A2, the devices are allocated access to the available bus windows W1 thru W7 in the following order: D1, D2, D1, D3, D1, D2, D1. Note that while there are still seven bus windows for this allocation period, the allocation period A2 occupied a total of 40 clock cycles.

This difference in the number of clock cycles per overall allocation period results from the ability of the apparatus of the present invention to allocate different devices different numbers of clock cycles per window as described above. Thus, since different devices with different numbers of assigned clock cycles per window were granted access to the available bus windows in each of the allocation periods, A1 20 and A2 22, the total number of clock cycles per allocation period was different.

Figure 3:
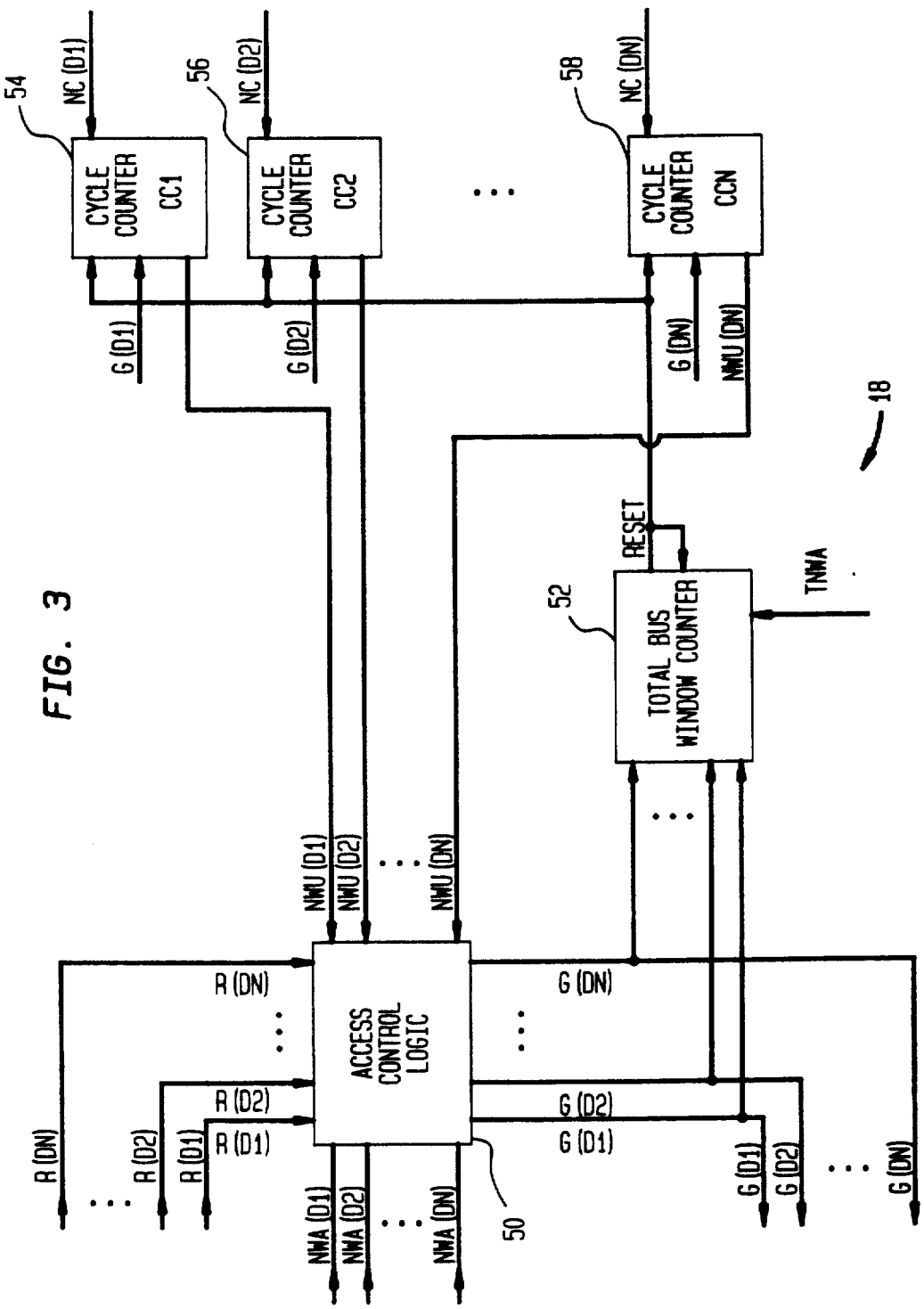
FIG. 3 is a block diagram of a logic circuit for an N input programmable arbiter according to an exemplary embodiment of the present invention.

FIG. 3 illustrates a block diagram of a logic circuit, according to the present invention, which serves as the arbiter 18 of FIG. 1.

The arbiter 18 comprises a series of 1 thru N cycle counters, 54, 56, 58. Each one of the 1 thru N cycle counters, 54, 56, 58 has a total of three inputs. A first input to each of the 1 thru N cycle counters is supplied with the signal NC(Dn) which indicates the number of clock cycles per window the corresponding device Dn has been allocated. Thus the first input to the cycle counter 54 (CC1) is supplied a corresponding input signal NC(D1). In a similar manner, the first input terminals of the remaining cycle counters CC2 56 thru CCN 58 are supplied with the signals NC(D2) thru NC(DN), respectively.

Each of the 1 thru N cycle counters 54, 56, 58 has a second input which is coupled to a corresponding grant output of an access control logic block 50. The access control logic block 50 has a 1 thru N number of grant output terminals and a series of 1 thru N input terminals which are supplied with the signals NWA(D1) thru NWA(DN) respectively.

The access control logic block 50 generates the grant signals G(D1) thru G(DN) which are asserted to indicate which one, if any, of the corresponding devices D1 10 thru DN 14 have been assigned access to the shared bus 16. In addition to being coupled to the second inputs of the corresponding 1 thru N cycle counters, respectively, the output terminals of the access control logic block 50 are coupled to the request signal outputs of the respective 1 thru N devices (see FIG. 1) and to a corresponding 1 thru N inputs of a total bus window counter 52.

The total bus window counter 52 has an input terminal which is supplied with the signal, TNWA, which indicates the total number of windows available during any particular allocation period. A reset output terminal of the bus window counter 52 is coupled back to the reset input of the bus window counter 52 and to the reset input terminals of each one of the 1 thru N cycle counters, CC1 54 thru CCN 58.

The arbiter's 1 thru N request inputs, which receive the request signals R(D1) thru R(DN) output by the devices D1 10 thru DN 14 respectively, are coupled to respective request input terminals of the access control logic block 50.

The access control logic block 50, has a second series of N inputs, with each input being coupled to an output terminal of the respective I thru N cycle counters 54, 56, 58. In this manner, the signal NWU(Dn), which indicates the number of bus windows previously used by the particular device Dn, output by the cycle counters 54, 56, 58, is supplied to the access control logic block 50.

The access requests in the form of asserted request signals, R(Dn), from each of the devices D1 10 thru DN 14 are received by the access control logic block 50. The access control logic block 50 is also supplied with the output signals NWU(Dn), which indicate the number of windows the device Dn has already used during the particular allocation period, from each one of the cycle counters CC1 54 thru CCN 58.

The access control logic block 50 uses this information, combined with the information supplied on the number of windows each device has been allocated, NWA(D1) thru NWA(DN), to implement any selected arbitration scheme to assign one of the requesting devices, 10, 12 or 14, access to the bus 16.

The access control logic block assigns a device, Dn, access to the bus by asserting a single grant output signal, G(Dn), while all the other grant output signals remain deasserted. Thus, the device Dn that receives the asserted signal G(Dn) is given access to the bus 16 for one bus window.

The grant output signals G(D1) thru G(DN) are supplied to respective input terminals of the total bus window counter 52 and to the respective cycle/window counters 54, 56, 58 corresponding to the devices D1 14 thru DN 14. When the cycle counter Ccn receives an asserted grant signal G(Dn) it indicates that the device which the counter corresponds to has been given access to the bus and the counter is enabled. The counter which is also supplied with the signal NC(Dn), which indicates the number of clock cycles per window that have been allocated to the particular device Dn, counts clock cycles from the time the device Dn was given access to the bus 16. When the number of clock cycles counted reaches the value of the signal NC(Dn), the counter increments the signal NWU(Dn).

Incrementing of the signal, NWU(Dn), which is supplied to the access control logic block 50, causes the control block 50 to briefly deassert all of the grant signals and then to allocate a new bus window according to the selected arbitration scheme.

Each time the access control logic block 50 allocates a bus window, a grant signal G(Dn) is asserted. This causes the total window counter, which is supplied with the grant signals G(D1) to increment the count of bus windows allocated. Each time all the grant signals G(D1) thru G(DN) are deasserted before the allocation of a new bus window, the count of the number of bus windows which has been allocated is compared with the number of total bus windows allowed, TWNA, per allocation period. When the count of bus windows allocated equals the total number of windows available, indicated to the counter 52 by the signal TNWA, the total bus window counter 52 asserts its output which is the counter reset signal.

Assertion of the counter reset signal, by the total bus window counter 52, causes all counters including the total bus window counter 52 and the cycle counters 54, 56, 58 to reset indicating the start of a new bus window allocation period.

It becomes apparent that the selection of various arbitration schemes can limit the number of counters required to implement the above design to a number less than N, the total number of devices present. For instance, if a number of devices have been allocated 100% of the available bandwidth, and the same number of clock cycles per bus window, a single cycle counter may be used by such devices to indicate when access to a bus window has been completed. In such a case, individual counters for each device are unnecessary since there is no need to keep track of the number of windows used by the particular devices. This is true since a device which has been allocated 100% of the bandwidth will never exceed its allocated number of available bus windows in any particular allocation period.

Figure 4:
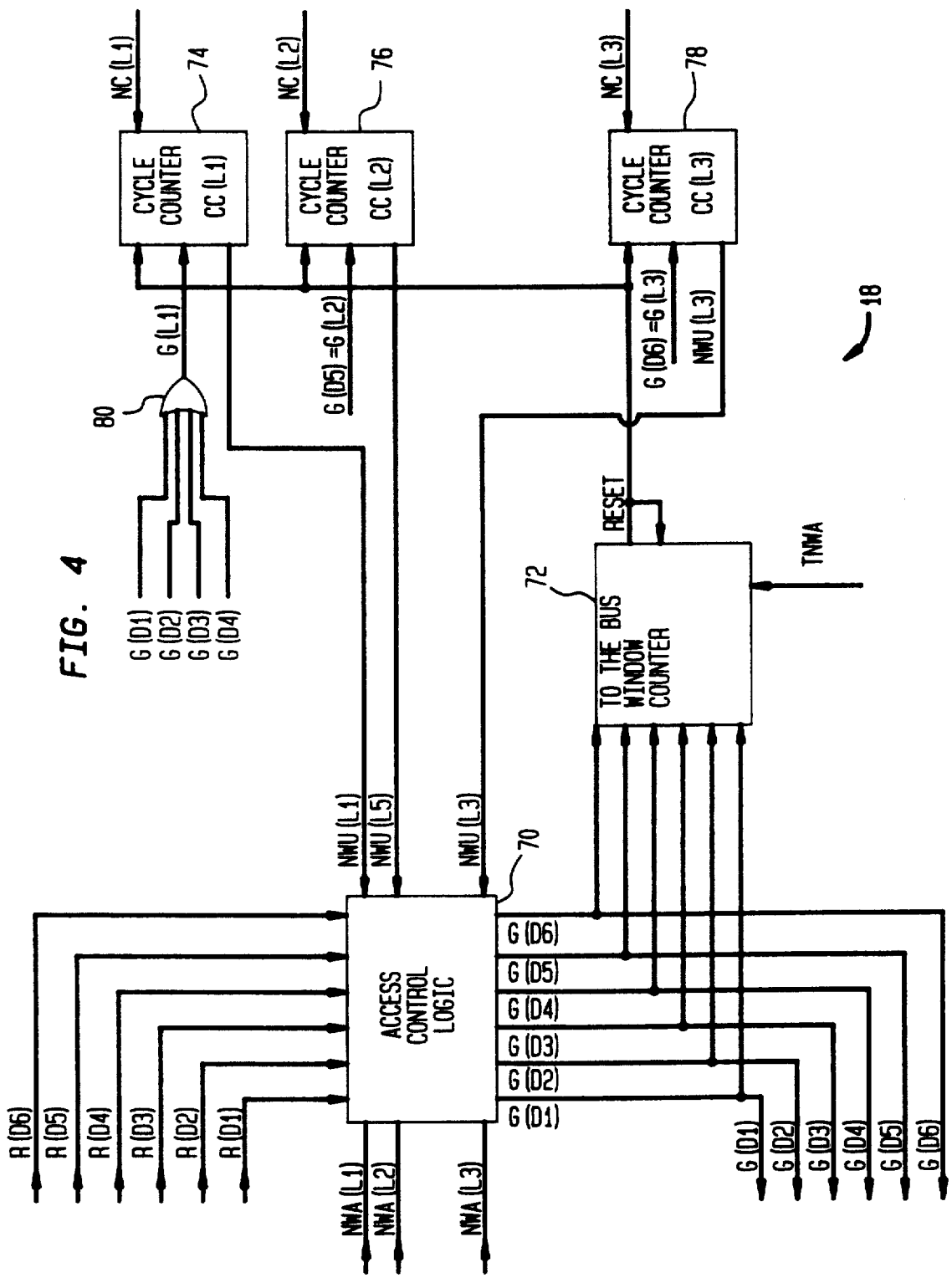
FIG. 4 is a block diagram of a logic circuit implementing an arbiter according to another embodiment of the present invention.

In another embodiment of the present invention, illustrated in FIG. 4, priority levels and not devices are allocated a percentage of the available bus bandwidth. Thus, in this particular embodiment, priority levels are allocated a number of bus windows per allocation cycle. In this implementation, the number of cycles per bus window for any given level is adjustable. However, devices on the same priority level cannot be assigned a different number of cycles per bus window from other devices on the same priority level.

This approach of allocating bandwidth to priority levels as opposed to individual devices has a distinct advantage in terms of implementation efficiency since it permits the number of counters needed to implement an arbitration scheme to be minimized with only a single counter being required per level particularly where multiple devices are present on a single priority level.

Referring now to FIG. 4 there is illustrated an arbiter 18, according to one embodiment of the present invention, for arbitrating between six devices on a total of three different priority levels. In this embodiment there are six devices, D1 thru D6, which can request access to the common bus 16.

A straight priority scheme is implemented for four of the devices D1 thru D4 which are all assigned to a single priority level. This is done by assigning the four devices D1 thru D4 to priority level, L=1, with each one of the four devices D1 thru D4 being assigned to a different sublevel. Thus, device D1 is assigned to level L=1a, device D2 to level L=1b, device D3 to level L=1c, and device D4 to level L=1d. Level L=1 is given a bandwidth allocation of 100%, which means that level 1 is allocated a number of windows equal to the total number of windows per allocation period. Level 1 is further allocated four clock cycles per bus window. This is equivalent to giving each of the four devices, D1 thru D4, a bandwidth allocation, PBW(D1)=PBW(D2)=PBW(3)=PBW(4)=100% with all four of the devices being given the same allocation of 4 clock cycles per bus window.

Such a priority and bandwidth allocation is possible since the devices D1 thru D4 utilize only a small percentage of the overall bus bandwidth during normal operation in the particular application. D1 could, e.g., utilize 2.6% of the overall bus bandwidth at most, D2 a maximum of 1.6% of the overall bus bandwidth, D3 a maximum of 3.75% and D4 a maximum 16.8%.

Thus, the priority allocations for devices D1 thru D4 may be expressed as follows:

| | |
|---|---|
| D1 | L(D1) = 1a |
| | N(D1) = 4 |
| | PBW(D1) = 100% |
| D2 | L(D2) = 1b |
| | N(D2) = 4 |
| | PBW(D2) = 100% |
| D3 | L(D3) = 1c |
| | N(D3) = 4 |
| | PBW(D3) = 100% |
| D4 | L(D4) = 1d |
| | N(D4) = 4 |
| | PBW(D4) = 100% |

While this priority allocation of bandwidth may result in devices with less than 100% bandwidth allocation being denied access to the common bus while the requests of devices D1 thru D4 are being serviced, the maximum percentage of overall bus bandwidth that can be utilized by the devices D1 thru D4 during normal operation is sufficiently small to permit all four of the devices to be assigned a 100% bandwidth allocation without any significant degradation in the overall system performance.

When PBW(Ln)=100%, there is no need to implement any function to check if the number of windows used exceeds the number of windows allocated per allocation period, since the devices on that level are permitted to utilize 100% of the overall bus bandwidth. However, a counter is still required to indicate when devices at that level have completed access to an allocated bus window by incrementing a signal which represents the number of windows used by devices at that level.

Thus, by assigning devices D1 thru D4 the highest possible priority in terms of bus bandwidth allocation, PBW(Dn)=100%, a significant reduction in the amount of hardware required to implement the arbiter is achieved.

The remaining two devices, D5 and D6 are each assigned to their own priority levels, level L=2 and L=3, respectively. The bandwidth allocated to each level and thus each of the devices, D5 and D6 is made programmable. In this manner, both devices are permitted enough access to the bus 16 to continue on with their own tasks without completely locking the other out of access to the bus 16.

The bandwidth programmability feature provides for a degree of flexibility regarding the amount of access, each of the devices D5 or D6 are permitted, to the shared bus 16. In this manner, the priority allocations of the bus bandwidth made by the arbiter 18, to the devices D5 and D6, can be varied depending on the particular application in which the arbiter is being utilized.

Devices D4 and D5 are assigned the following characteristics:

| | |
|---|---|
| D5 | L(D5) = 5a |
| | N(D5) = 4 |
| D6 | L(D6) = 5b |
| | N(D6) = 5 |

Several bandwidth programmability options are possible, for example allocations of bandwidth may be as follows:

| D5 | PBW(D5) | 75% | 87% | 94% | 97% |
|---|---|---|---|---|---|
| D6 | PBW(D6) | 25% | 13% | 6% | 3% |

Note, however, that to improve overall system performance, the extended arbitration scheme may be implemented. In such a case, the device at the lowest priority level, e.g. device D6, is effectively given a 100% bandwidth allocation since it will always be given access to the bus if no devices at a higher priority level are asserting an access request.

The overall equation for the next available bus window for the arbiter 18 of FIG. 4, implementing the extended programmable arbitration scheme, is:

```
IF D1 THEN
        arb_winner = D1
        NWU(L1) = NWU(L1) + 1
ELSE
    IF D2 THEN
            arb_winner = D2
            NWU(L1) = NWU(L1) + 1
    ELSE
        IF D3 THEN
                arb_winner = D3
                NWU(L1) = NWU(L1) + 1
        ELSE
            IF D4 THEN
                    arb_winner = D4
                    NWU(D4) = NWU(D4) + 1
            ELSE
                IF D5 and (NWU(L2) < NWA(L2)
                OR /D6) THEN
                        arb_winner = D5
                        NWU(L2) = NWU(L2) + 1
                ELSE
                    IF D6¹ AND (NWU(L3) < NWA(L3)
                    OR /D5) THEN
                            arb_winner = D6
                            NWU(L3) = NWU(L3) + 1
                    ENDIF
                ENDIF
            ENDIF
        ENDIF
    ENDIF
ENDIF
```

[1]Note that the logic for D6 could be implemented as "IF D6 THEN" since this is the last device in an extended arbitration scheme. Thus, device D6 will be given access to the shared resource 16 whenever it is requesting access and the other devices are not requesting access.

where:

/R(D5) means that the device on L=2, D5, is not requesting access to the bus 16

/R(D6) means that the device on L=3, D6, is not requesting access to the bus 16

An access control logic block 70 has a series of six access request input terminals, with each input terminal being coupled to a request output terminal of one of the respective devices D1 thru D6. In this manner, the access control logic block 70 is supplied with the request signals R(D1) thru R(D6).

The access control logic block 70 has a series of three number of windows allocated (NWA) inputs. A first one of these inputs is supplied with the signal NWA(L1) which indicates the number of windows allocated to level one per allocation period. A second number of windows allocated signal input is supplied with the signal NWA(L2) which indicates the number of windows allocated to priority level 2. A third number of windows allocated signal input is supplied with the signal NWA(L3) which indicates that the number of windows per allocation period allocated to priority level 3.

The access control logic block 70 has a series of six grant output signal terminals which supply the signals G(D1) thru G(D6). Each one of the six grant signal output terminals is coupled to a corresponding grant input terminal belonging to the devices D1 thru D6, respectively.

The access control logic block 70 has a first, second and third, number of windows utilized, signal input terminals. Each one of the number of windows utilized signal inputs is coupled to the output of a first second or third cycle counter 74, 76, 78, respectively.

Each of the three cycle counters 74, 76, 78 correspond to one of the priority levels of the implemented arbitration scheme. Thus, the first cycle counter 74 is used to count the number of bus windows used in an allocation period by devices on priority level 1, which include devices D1, D2, D3, and D4. The second cycle counter 76 keeps track of the number of bus windows used by the device D5 on the second priority level while the third cycle counter 78 is used to keep track of the number of bus windows used by device D6 on priority level 3.

Each one of the three cycle counters 74, 76, 78 has an input which is supplied with a signal NC(L1), NC(L2) or NC(L3) which indicates the number of cycles per bus window which have been allocated to devices on priority level 1, 2, or 3, respectively.

The cycle counter 74 has an enable input which is coupled to the output of an OR gate 80. The OR gate 80 has a series of four input terminals. A first input to the OR gate 80 is coupled to the grant, G(D1) signal output of the access control logic block 70. The second input of the OR gate 80 is coupled to the grant, G(D2) signal output of the logic block 70 while the third and fourth inputs to the OR gate 80 are coupled to the G(D3) and G(D4) signal outputs of the access control logic block 70, respectively. Thus, whenever any one of the grant signals G(D1), G(D2), G(D3) or G(D4) are asserted, the output of the OR gate 80, coupled to the enable input of the first cycle counter 74, will be asserted indicating that a device on priority level 1 has been given access to the bus 16.

The second cycle counter 76 has its enable input coupled to the grant G(D5) signal output of the access control logic block 70, while the third cycle counter 78 has its enable input coupled to the grant, G(D6) signal output of the access control logic block 70.

A reset input of each of the cycle counters 74, 76, 78 are coupled to the reset output of a total bus window counter 72. The total bus window counter 72 has a reset input which is coupled to its reset signal output.

The total bus window counter 72 has a series of six inputs with each input being coupled to one of the six grant signal outputs G(D1) thru G(D6) of the access control logic block 70. The total bus window counter 72 has another input which is supplied with the signal TNWA which indicates the total number of windows which are available per allocation period.

When an access request, R(Dn), is asserted by one of the six devices, D1 thru D6, the access control logic block 70 allocates access to the bus 16 based on the arbitration scheme selected for implementation which, in this example, is the arbitration scheme for six devices described above. In making the access allocation determination, the access control logic block 70, uses the signals R(Dn) which indicates the various requests being asserted, the signals NWA(L1), NWA(L2), and NWA(L3), which indicate the number of windows allocated to each of the three priority levels, and the signals NWU(L1), NWU(L2) and NWU(L3) which indicate the number of windows which were already used by the devices on the given priority levels during the particular allocation period.

When the access control logic block assigns one of the requesting devices, e.g. D5, access to the bus 16, the access control logic block 70 asserts the grant signal G(D5) associated with the particular device D5. This serves to inform the device D5 that it has been assigned access to the bus 16 and also enables the third cycle counter 78 for the priority level, L=3, to which the device D5 is assigned.

The third cycle counter 78 counts the number of clock cycles from the time the signal G(D5), which is equal to the signal G(L3) since no other devices are present on the level, is asserted until the number of clock cycles equals the number of cycles allocated per window for devices on level 3 indicated by the signal NC(L3) which is supplied to the third cycle counter 78. When the counted number of clock cycles equals the number of cycles allocated per window, the cycle counter 78 increments the signal NWU(L3).

When one of the number of windows used, NWU, signals supplied to the access control logic device 70 is incremented, this causes the access control logic device 70 to briefly deassert all of the grant signals G(D1) thru G(D6) and to proceed to allocate another bus window.

Whenever a grant signal G(Dn) is asserted, it causes the total bus window counter to increment by one. Upon desertion of all of the grant signals, the total bus window counter 72 compares the number count, of the total number of windows allocated during the particular allocation period, to the total number of windows allowed per allocation period indicated by the value of the signal TWNA. If the total number of windows allocated during the particular allocation period equals the total number of windows allowed per allocation period, the total bus window counter 72 asserts its reset output signal. This causes the cycles counter 74, 76, 78 and the total window counter 72 to reset starting a new allocation period.

What is claimed is:

1. A programmable arbiter for granting access to a shared resource among N requestors, comprising:

an access control system comprising an access control logic device and a total window counter coupled to the access control logic device, the total window counter storing information on an allocation period for access to the shared resource, the allocation period comprising a preselected number of windows;

the access control logic device storing a series of numbers, each number comprising a number of windows per allocation period available for use by a respective one of the N requestors;

the access control device adapted for receiving request signals from the N requestors;

the access control logic device including a plurality of grant signal outputs, each one of the grant signal outputs corresponding to one of the N requestors;

each one of the grant signal outputs adapted for coupling to the corresponding one of the N requestors; and a plurality of counters, each of the counters programmed to store information on a number of clock cycles available for use by a respective one of the N requestors during a window;

each one of the counters coupled to a respective one of the grant signal outputs;

each of the counters further coupled to the access control device to increment and provide a signal representative of a number of windows used by the corresponding one of the N requestors during the current allocation period when a grant signal is asserted on the respective grant output, and upon counting the number of clock cycles;

the access control logic device operating to generate a grant signal on one of the grant signal outputs as a function of the request signals received from the N requestors and the signal representative of the number of windows used received from the plurality of counters;

the incrementing of the signal representative of the number of windows used, by the counter corresponding to the grant signal output having the grant signal, providing an indication to the access control device that a next grant signal can be generated.

2. The programmable arbiter of claim 1, wherein each number of windows per allocation period is programmable.

3. The programmable arbiter of claim 2, wherein the shared resource is a bus.

4. The programmable arbiter of claim 2 wherein, each one of the cycle counters further comprises a reset terminal;

the total window counter is further coupled to the reset terminal of each cycle counter;

the total window counter incrementing a total window count during each current allocation period upon the assertion of each grant signal;

the total window counter asserting a reset signal to each reset terminal upon the total window count equaling the preselected number of windows comprising the allocation period.

5. A programmable arbiter for granting access to a shared resource among N requestors, comprising:

an access control system comprising an access control logic device and a total window counter coupled to the access control logic device, the total window counter storing information on an allocation period for access to the shared resource, the allocation period comprising a preselected number of windows;

the access control logic device storing information on an M number of priority levels with each one of the N requestors being assigned to one of the M priority levels;

the access control logic device further storing a series of numbers, each number comprising a number of windows per allocation period available for use by the requestors on a corresponding one of the M priority levels;

the access control device adapted for receiving request signals from each of the N requestors;

the access control logic device including a plurality of grant signal outputs, each one of the grant signal outputs corresponding to one of the N requestors;

each one of the grant signal outputs adapted for coupling to the corresponding one of the N requestors; and a plurality of counters, each counter corresponding to a respective one of the M priority levels;

each of the respective counters being coupled to each of the grant signal outputs corresponding to the requestors assigned to the respective M priority level;

each of the counters programmed to store information on a number of clock cycles available for use by the requestors on one of the M priority levels during a window;

each of the counters further coupled to the access control device to increment and provide a signal representative of a number of windows used by the requestors assigned to the corresponding one of the M priority levels during the current allocation period when a grant signal is asserted on the one of the grant signal outputs corresponding to the requestors assigned to the respective M priority level, and upon counting the number of clock cycles;

the access control logic device operating to generate a grant signal on one of the grant signal outputs as a function of the request signals received from the N requestors and the signals representative of the number of windows used received from the plurality of counters;

the incrementing of the signal representative of the number of windows used, by the counter corresponding to the grant signal output having the grant signal, providing an indication to the access control logic device that a next grant signal can be generated.

6. The programmable arbiter of claim 5, wherein each one of the cycle counters further comprises a reset terminal;

the total window counter is further coupled to the reset terminal of each cycle counter;

the total window counter incrementing a total window count during each current allocation period upon the assertion of each grant signal;

the total window counter asserting a reset signal to each reset terminal upon the total window count equaling the preselected number of windows comprising the allocation period.

7. The programmable arbiter of claim 6, wherein the access control logic device generates a grant signal whenever one of the request signals is asserted in a current allocation period.

8. The programmable arbiter of claim 5, wherein the shared resource is a bus.

9. A programmable arbiter for granting access to a shared resource among N requestors, comprising:

an access control system comprising an access control logic device and a total window counter coupled to the access control logic device, the total window counter storing information on an allocation period for access to the shared resource, the allocation period comprising a preselected number of windows;

the access control logic device storing information on an M number of priority levels with each one of the N requestors being assigned to one of the M priority levels;

the access control logic device further storing a series of numbers, each number comprising a number of windows per allocation period available for use by the requestors on a corresponding one of the M priority levels;

the access control device adapted for receiving request signals from each of the N requestors;

the access control logic device including a plurality of grant signal outputs, each one of the grant signal outputs corresponding to one of the N requestors;

each one of the grant signal outputs adapted for coupling to the corresponding one of the N requestors;

a plurality of counters, each counter corresponding to a respective one of the M priority levels;

at least one logic gate, each logic gate corresponding to one of the M priority levels where preselected ones of the N requestors are assigned to the same one of the M priority levels;

an output of each one of the respective logic gates coupled to the respective corresponding counter; and a series of inputs of each one of the logic gates coupled to the grant signal outputs, corresponding to the requestors on the respective one of the M priority levels and at least one of the grant signal outputs corresponding to the requestors on the respective ones of the M priority levels coupled to the respective corresponding counter.

each of the counters programmed to store information on a number of clock cycles available for use by the requestors on one of the M priority levels during a window;

each of the counters further coupled to the access control device to increment and provide a signal representative of a number of windows used by the corresponding one of the N requestors during the current allocation period when a grant signal is asserted on the respective grant output, and upon counting the number of clock cycles;

the access control logic device operating to generate a grant signal on one of the grant signal outputs as a function of the request signals received from the N requestors and the signals representative of the number of windows used received from the plurality of counters;

the incrementing of the signal representative of the number of windows used by the counter corresponding to the grant signal output having the grant signal, providing an indication to the access control logic device that a next grant signal can be generated.

10. The programmable arbiter of claim 9, wherein each one of the cycle counters further comprises a reset terminal;

the total window counter is further coupled to the reset terminal of each cycle counter;

the total window counter incrementing a total window count during each current allocation period upon the assertion of each grant signal;

the total window counter asserting a reset signal to each reset terminal upon the total window count equaling the preselected number of windows comprising the allocation period.

11. The programmable arbiter of claim 9, wherein the access control logic device generates a grant signal whenever one of the request signals is asserted in a current allocation period.

12. The programmable arbiter of claim 9, wherein the shared resource is a bus.

13. The programmable arbiter of claim 9 wherein the logic gate comprises an OR gate.

14. A programmable arbiter for granting access to a shared resource among N requestors, comprising:

an access control system comprising an access control logic device and a total window counter coupled to the access control logic device, the total window counter storing information on an allocation period for access to the shared resource, the allocation period comprising a preselected number of windows;

the access control logic device storing a number of windows per allocation period available for use by each of the N requestors;

the access control device adapted for receiving request signals from the N requestors;

the access control logic device including a plurality of grant signal outputs, each one of the grant signal outputs corresponding to one of the N requestors;

each one of the grant signal outputs adapted for coupling to a corresponding one of the N requestors; and a plurality of counters, each of the counters programmed to store information on a number of clock cycles available for use by a respective one of the N requestors during a window;

each one of the counters coupled to a respective one of the grant signal outputs;

each of the counters further coupled to the access control device to increment and provide a signal representative of a number of windows used by a corresponding one of the N requestors during the current allocation period when a grant signal is asserted on the respective grant output and upon counting the number of clock cycles;

the access control logic device operating to generate a grant signal on one of the grant signal outputs as a function of the request signals received from the N requestors and the signals representative of the number of windows used received from the plurality of counters;

the incrementing of the signal representative of the number of windows used signal by the counter corresponding to the grant signal output having the grant signal, providing an indication to the access control logic device that a next grant signal can be generated;

the access control logic device generating a grant signal whenever one of the request signals is asserted in a current allocation period.

15. The programmable arbiter of claim 14, wherein the shared resource is a bus.

16. A programmable arbiter for granting access to a shared resource among N requestors, comprising:

an access control logic device;

means for storing information on an allocation period for access to the shared resource, coupled to the access control logic device, the allocation period comprising a preselected number of windows;

the access control logic device storing a series of numbers, each number comprising a number of windows per allocation period available for use by a respective one of the N requestors;

the access control device adapted for receiving request signals from the N requestors;

the access control logic device including a plurality of grant signal outputs, each one of the grant signal outputs corresponding to one of the N requestors;

each one of the grant signal outputs adapted for coupling to the corresponding one of the N requestors; and a plurality of counters, each of the counters programmed to store information on a number of clock cycles available for use by a respective one of the N requestors during a window;

each one of the counters coupled to a respective one of the grant signal outputs;

each of the counters further coupled to the access control device to increment and provide a signal representative of a number of windows used by the corresponding one of the N requestors during the current allocation period when a grant signal is asserted on the respective grant output, and upon counting the number of clock cycles;

the access control logic device operating to generate a grant signal on one of the grant signal outputs as a function of the request signals received from the N requestors and the signals representative of the number of windows used received from the plurality of counters;

the incrementing of the signal representative of the number of windows used by the counter corresponding to the grant signal output having the grant signal, providing an indication to the access control logic device that a next grant signal can be generated.

17. The programmable arbiter of claim 16, wherein each number of windows per allocation period is programmable.

18. The programmable arbiter of claim 17, wherein the shared resource is a bus.

19. A programmable arbiter for granting access to a shared resource among N requestors, comprising:

an access control system comprising an access control logic device and a total window counter coupled to the access control logic device, the total window counter storing information on an allocation period for access to the shared resource, the allocation period comprising a preselected number of windows;

the access control logic device storing a series of numbers, each number comprising a number of windows per allocation period available for use by a respective one of the N requestors;

the access control device adapted for receiving request signals from the N requestors;

the access control logic device including a plurality of grant signal outputs, each one of the grant signal outputs corresponding to one of the N requestors;

each one of the grant signal outputs adapted for coupling to the corresponding one of the N requestors; and a plurality of counters, each of the counter programmed to store information on a number of clock cycles available for use by a respective one of the N requestors during a window;

each one of the counters coupled to a respective one of the grant signal outputs;

each of the counters further coupled to the access control device to increment and provide a signal representative of a number of windows used by the corresponding one of the N requestors during the current allocation period when a grant signal is asserted on the respective grant output, and upon counting the number of clock cycles;

the access control logic device operating to generate a grant signal on one of the grant signal outputs as a function of the request signals received from the N requestors and the signals representative of the number of windows used received from the plurality of counters;

the incrementing of the signal representative of the number of windows used by the counter corresponding to the grant signal output having the grant signal, providing an indication to the access control logic device that a next grant signal can be generated;

the access control logic device generating a grant signal corresponding to a requestor which has used up its available number of windows for the current allocation period, if:

(i) the respective requestor has asserted a request, and (ii) no requestors, which have not used their allocated number of windows for the current allocation period, are asserting a request.

20. The programmable arbiter of claim 19, wherein each number of windows per allocation period is programmable.

21. The programmable arbiter of claim 20, wherein each one of the cycle counters further comprises a reset terminal;

the total window counter is further coupled to the reset terminal of each cycle counter;

the total window counter incrementing a total window count during each current allocation period upon the assertion of each grant signal;

the total window counter asserting a reset signal to each reset terminal upon the total window count equaling the preselected number of windows comprising the allocation period.

22. The programmable arbiter of claim 19, wherein the shared resource is a bus.

23. A method of operating a programmable arbitration system for granting access to a shared resource among N requestors, comprising the steps of:

assigning a total allocation period of a first predetermined number of windows, for access to the shared resource by the N requestors;

storing the assigned total allocation period;

assigning a predetermined number of windows comprising a requestor allocation period for each respective one of the N requestors;

storing the assigned requestor allocation periods;

communicating a requestor signal from any one or more of the N requestors, each requestor signal corresponding to a respective one of the N requestors which initiated the communication;

communicating a grant signal from a control device to any one of the N requestors in response to the communication of a respective one of the requestor signals;

communicating the grant signal from the control device to a corresponding one of a plurality of counter devices in response to the communication of the respective one of the requestor signals;

assigning a predetermined number of clock cycles to be available for use by each respective one of the N requestors during each window;

programming the plurality of counter devices to store the assigned number of clock cycles available for use by each respective one of the N requestors during the predetermined number of windows comprising the respective requestor allocation period;

counting the number of clock cycles, upon the communication of the grant signal to the one of the plurality of counter devices, in the respective counter device;

communicating a signal from the respective one of the plurality of counter devices representative of the number of windows used by the corresponding one of the N requestors in a current allocation;

receiving the signal representative of the number of windows used in the control device and indicating to the control device that another grant signal can be communicated to one or more of the N requestors.

24. A method of operating a programmable arbitration system for granting access to a shared resource among N requestors each one of the N requestors being assigned one of M priority levels, the method comprising the steps of:

assigning a total allocation period of a first predetermined number of windows, for access to the shared resource by the N requestors having M priority levels;

storing the assigned total allocation period;

assigning a predetermined number of windows comprising a priority level allocation period for each respective one of the M priority levels;

storing the assigned M priority levels allocation periods;

communicating a requestor signal from any one or more of the N requestors, the requestor signal corresponding to the respective one of the N requestors which initiated the communication;

communicating a grant signal from a control device to any one of the N requestors in response to the communication of a respective one of the requestor signals;

communicating the grant signal from the control device to a corresponding one of a plurality of counter devices in response to the communication of the respective one of the requestor signals;

assigning a predetermined number of clock cycles to be available for use by each respective one of the M priority levels;

programming the plurality of counter devices to store the assigned number of clock cycles available for use by each respective one of the M priority levels during the predetermined number of windows comprising the respective priority level allocation period;

counting the number of clock cycles, upon the communication of the grant signal to one or more of the plurality of counter devices, in the respective counter device;

communicating a signal from the respective one of the plurality of counter devices representative of the number of windows used by the corresponding one of the M priority levels in a current allocation;

receiving the signal representative of the number of windows used in the control device and indicating to the control device that another grant signal can be communicated to one or more of the N requestors.

* * * * *